(12) United States Patent
Li et al.

(10) Patent No.: US 11,609,758 B2
(45) Date of Patent: Mar. 21, 2023

(54) DRUG RESEARCH AND DEVELOPMENT SOFTWARE REPOSITORY AND SOFTWARE PACKAGE MANAGEMENT SYSTEM

(71) Applicant: SHENZHEN JINGTAI TECHNOLOGY CO., LTD., Guangdong (CN)

(72) Inventors: Bingkun Li, Guangdong (CN); Liang Tan, Guangdong (CN); Chunan Wu, Guangdong (CN); Jian Ma, Guangdong (CN); Lipeng Lai, Guangdong (CN); Shuhao Wen, Guangdong (CN)

(73) Assignee: SHENZHEN JINGTAI TECHNOLOGY CO., LTD., Guangdong (CN)

( * ) Notice: Subject to any disclaimer, the term of this patent is extended or adjusted under 35 U.S.C. 154(b) by 61 days.

(21) Appl. No.: 17/263,157

(22) PCT Filed: Dec. 31, 2019

(86) PCT No.: PCT/CN2019/130436
§ 371 (c)(1),
(2) Date: Jan. 26, 2021

(87) PCT Pub. No.: WO2021/004042
PCT Pub. Date: Jan. 14, 2021

(65) Prior Publication Data
US 2021/0200536 A1    Jul. 1, 2021

(51) Int. Cl.
*G06F 9/44* (2018.01)
*G06F 8/71* (2018.01)
(Continued)

(52) U.S. Cl.
CPC ............ *G06F 8/71* (2013.01); *G06F 8/61* (2013.01); *G06F 9/44526* (2013.01); *G06F 16/285* (2019.01); *H04L 63/083* (2013.01)

(58) Field of Classification Search
CPC .......... G06F 8/61; G06F 8/71; G06F 9/44526; G06F 16/285; H04L 63/083
USPC .................... 717/101–105, 120–123
See application file for complete search history.

(56) References Cited

U.S. PATENT DOCUMENTS

| | | | |
|---|---|---|---|
| 6,957,186 B1* | 10/2005 | Guheen ............ | G06Q 90/20 705/323 |
| 8,356,280 B2* | 1/2013 | Becker ............. | G06F 8/44 717/122 |

(Continued)

FOREIGN PATENT DOCUMENTS

| | | |
|---|---|---|
| CN | 1987777 | 6/2007 |
| CN | 102915233 | 2/2013 |

(Continued)

OTHER PUBLICATIONS

Erick H Turner, "How to Access and Process FDA Drug Approval Packages for Use in Research", 2013, ResearchGate, 9 pages (Year: 2013).*

(Continued)

*Primary Examiner* — Ted T. Vo
(74) *Attorney, Agent, or Firm* — Muncy, Geissler, Olds & Lowe, P.C.

(57) ABSTRACT

A drug research and development software repository and a software package management system. The drug research and development software repository includes a user authentication module, a software package upload and index creation module, a baseline release management module, an authorization management module, a software package retrieval and download module, an adapter plug-in, and a storage layer. The software package management system includes an authentication module, a package management service module, a web front-end module, and a command line tool module. Various object storage services can be connected to software repositories through a plug-in mode, (Continued)

thereby realizing cross-platform, and multi-development language software package management; authentication and authorization function are added in making the software distribution more concise; the baseline management function is added in to make the software release more concise, and improve the collaboration efficiency of internal developers in the development of different software packages of the same software system.

6 Claims, 1 Drawing Sheet

(51) Int. Cl.
*G06F 16/28* (2019.01)
*G06F 8/61* (2018.01)
*G06F 9/445* (2018.01)
*H04L 9/40* (2022.01)

(56) References Cited

U.S. PATENT DOCUMENTS

| | | |
|---|---|---|
| 2005/0132346 A1 | 6/2005 | Tsantilis |
| 2007/0006130 A1 | 1/2007 | Stamler et al. |
| 2007/0174810 A1* | 7/2007 | Hockenberry ............ G06F 8/20 717/100 |

FOREIGN PATENT DOCUMENTS

| | | |
|---|---|---|
| CN | 103853585 | 6/2014 |
| CN | 105072183 | 11/2015 |
| CN | 109725926 | 5/2019 |

OTHER PUBLICATIONS

Leprevost et al., "BioContainers: An Open-Source and Community-Driven Framework for Software Standardization", 2017, Oxford, pp. 2580-2582. (Year: 2017).*

Leprevost et al., "On Best Practices in The Development of Bioinformatics Software", 2014, Frontiers in Genetics, 3 pages. (Year: 2014).*

Jinzenji et al., "R&D Software Development Standards and their Operation", 2014, NTT Technical Review, 6 pages. (Year: 2014).*

Google, "Google Search Appliance—External Metadata Indexing Guide", 2015, Google Inc., 12 pages. (Year: 2015).*

"International Search Report (Form PCT/ISA/210)" of PCT/CN2019/130436, dated Oct. 10, 2020, with English translation thereof, pp. 1-6.

"Written Opinion of the International Searching Authority (Form PCT/ISA/237)" of PCT/CN2019/130436, dated Oct. 10, 2020, pp. 1-3.

* cited by examiner

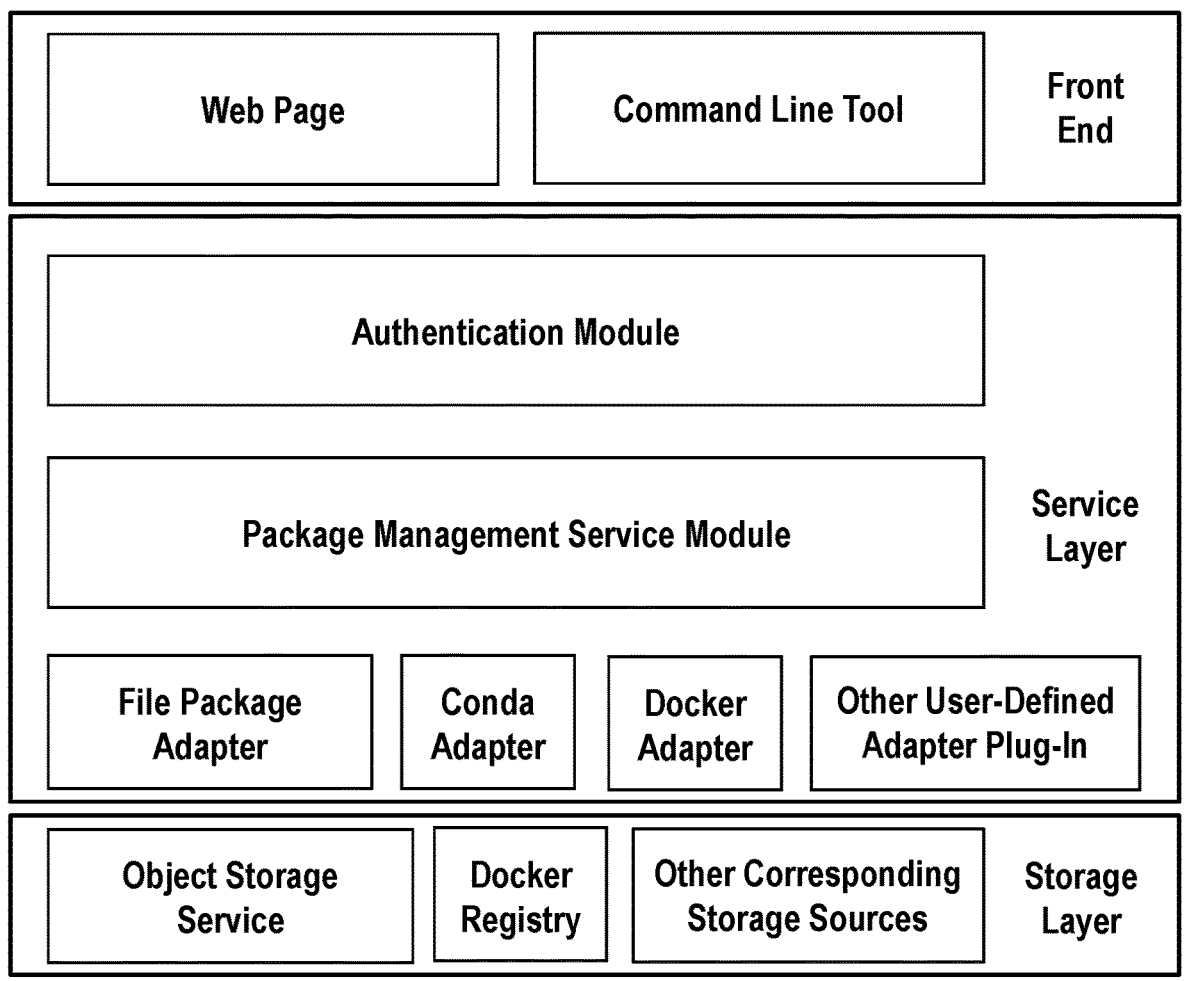

DRUG RESEARCH AND DEVELOPMENT SOFTWARE REPOSITORY AND SOFTWARE PACKAGE MANAGEMENT SYSTEM

CROSS-REFERENCE TO RELATED APPLICATION

This application is a 371 of international application of PCT application serial no. PCT/CN2019/130436, filed on Dec. 31, 2019. The entirety of each of the above mentioned patent applications is hereby incorporated by reference herein and made a part of this specification.

BACKGROUND

Technical Field

This invention pertains to the technical field of drug research and development data processing, and specifically relates to a drug research and development (R&D) software repository with software package management system.

Description of Related Art

Software repository and package management tools are generally used together for software release and installation.

Wherein, the software repository is a prepared directory, or a series of servers for storing software, or a website that contains software packages and index files.

The package management tools can automatically locate and obtain the correct software package in the repository, and provide management operations for the software package such as retrieval, installation, download, and deletion.

Commonly used software repository and package management tools such as apt, yum, pip, etc., provide software package release, storage, retrieval and installation functions.

The existing software repositories and package management tools have the following technical problems.

(1) Platform and development language restrictions: the drug R&D software is generally complicated and needs to be developed by a combination of multiple software development languages, and it is necessary to provide a cross-platform software development kit (SDK) to facilitate the use of partner companies. The existing software repository and package management system can only be used for a single development language or a single operating system platform. For example, apt and yum can only be used for the distribution of Linux system software, and pip can only be used for the distribution of software written in python.

(2) Lack of authorization function: the drug R&D software is generally used by the partner enterprise in the way of authorization, so a software repository with authorization function is required. Most of the existing software repositories and package management systems are used for open source software, as the open source software is free to use, the existing software repositories do not have software authorization functions or only have simple account& password verification functions.

(3) Lack of baseline definition: the drug R&D software is generally complex, composed of dozens of software packages, and the release of software packages needs to be controlled by defining baselines for easy management of the externally released packages and facilitating the collaboration of internal software developer. However, the existing software repository and package management systems mostly manage individual software package and software, and there is no clear baseline definition.

SUMMARY

In view of the above technical problems, this invention provides a drug research and development (R&D) software repository and a software package management system, thereby realizing cross-platform, and multi-development language software package management to make the software distribution more concise.

The technical solutions adopted are described as following.

The drug R&D software repository includes: a user authentication module, a software package upload and index creation module, a baseline release management module, an authorization management module, a software package retrieval and download module, an adapter plug-in, and a storage layer.

The user authentication module uses a command line tool or a web page on a front end to access the software repository resources after authenticated through a username and a password or an application identification (app id) and a secret key.

The software package upload and index creation module uploads the software package and metadata of the software package through the command line tool or the web page. The metadata includes the following main fields: a package type, a package name, a storage source address, a deployment environment (corresponding to the four software development processes including development, testing, staging, and production), an operating platform (linux-64, linux-32, win-64, etc.), a package version, a software dependency, and a software description.

After the software repository receives the data from the front end, it stores the metadata as meta information in a relational database for indexing; then selects the corresponding adapter plug-in according to the package type, and stores the software package in the corresponding storage source. For example, a conda adapter plug-in is used to store conda type packages in an object storage service that conforms to a conda channel specification. A plurality of adapter plug-ins for conda, docker, and general file packages are built in the software repository. In addition to the plurality of the adapter plug-ins provided by the software repository, other adapter plug-in is wrote to dock more software storage sources.

In the baseline release management module, the baseline is a "snapshot" of each software package component of a large software in the software repository in a specific period, used for software release and keeping the work synchronization of different software package component developers. The baseline release management module provides two main functions including baseline creation and baseline upgrade for a baseline management.

The baseline release management module can create a baseline on the web interface for a certain large software to be released, and select the software package components that constitute the baseline and a version of each software package to complete the release of a software baseline. After a period of iteration, when the requirements of a new stable version are reached, the baseline upgrade may be selected. At this time, a version number of each component is changed and new software package components are added.

In the drug R&D software repository, the baseline is abstracted into a special "software package" for management and storage. When the baseline is created or upgraded on the front end, a package, whose package type is the baseline, is created inside the software repository, and all components are used as a dependency declaration of the package, whose package type is the baseline. And this package is stored in the object storage service through an adapter corresponding to the baseline.

The authorization management module adopts RBAC (role-based access control) for authorization management, and the corresponding software package can be retrieved and installed only after the account is authorized. Authorization is divided into baseline authorization and software package authorization. The authorization management module can authorize access to all software packages included in a certain baseline, or authorize a software package separately.

The software package retrieval and download module, after being authenticated by an authorized account, can retrieve and download the software package within an authorized scope. The software package retrieval and download module first searches for the corresponding meta information in the relational database, and then selects the corresponding adapter plug-in to download the software package according to the package type.

The adapter plug-in, which is built-in or provided by the user, adapts to different underlying software repositories, so that different object storage systems are connect to third-party software repositories for storage and download.

The storage layer uses object storage services and the third-party software repositories as storage services (such as docker registry, conda channel) to store software packages. The relational database is used to store software package indexes and other metadata.

The software packages in the above-mentioned drug research and development software repository are managed by the following software package management system, including the following modules.

An authentication module is used to authenticate a username and a password of a user, or an application identification and a secret key, and grant different permissions to different accounts based on the RBAC;

A package management service module, which is a web service based on flask, is used to provide a REST (representational state transfer) Web application programming interface (API), and realize the management of the software package by calling different adapters.

A web front-end module provides web front-end services, allowing users to directly perform package management, authorization management, baseline management and other operations on a web page.

A command-line tool module provides command line tools that allow users to retrieve, install, and upload software packages on a command line client.

The drug R&D software repository and the software package management system provided by this invention have the following technical effects.

1. The system can be connected to various object storage services and software repositories through a plug-in mode, thereby realizing cross-platform and multi-development language software package management, break restrictions of the traditional software repositories that can only be used for a single system or language.

2. This system has been added authentication module with software authorization functions, allowing users to conveniently authorize the software developed within the company to partners, making the software distribution more concise.

3. The system has been added the baseline management function, abstracting the baseline into a special software package, so as to achieve the management and control of the baseline release and baseline upgrade, making the software release more concise, and improving the collaboration efficiency of internal developers in the development of different software packages of the same software system.

BRIEF DESCRIPTION OF THE DRAWINGS

FIG. 1 is a schematic diagram of the software repository structure of this invention.

DESCRIPTION OF THE EMBODIMENTS

The technical solutions of this invention will be further described in detail below with the drawing and embodiments.

The software repository structure is as shown in FIG. 1. The implementation of this system is mainly based on the web API and command line client developed by the flask web development framework in python 2.7 language, and the web front-end interface developed based on the electron framework. The relational data of the package index is stored in PostgreSQL hosted on AWS (Amazon Web Services) RDS (Relational Database Service), the published software package is stored in AWS S3, and the docker image is stored in AWS ECR (Elastic Container Registry).

There are two ways for users to access the software package, one is the command line client mode and the other is the web interface mode.

Wherein, in the command line client mode, users can install the command line client through the Python environment. After logging in to the system through a login command of Pubtools, the software package is pushed to this system through a publish command of Pubtools, or the software package is downloaded through an install command of Pubtools, or the list of software packages is viewed in the system through a search command of Pubtools.

Users can also log in to the website of the system through a browser, and view and download software packages through the web interface. First the software package to be viewed is selected on the homepage, then the package name is clicked to view the package version list, and the view details or download tab of a certain version is clicked to view and download the package.

The user can only perform baseline management through the web page. The user can click Baseline Management→Create Baseline on the homepage, then enter the name of the software baseline to be created. Finally, the user selects the software packages included in the baseline and their corresponding versions, and clicks OK to complete the creation. When baseline improvement is required, the user clicks Baseline Management→Select Baseline Improvement on the homepage, then enters the name of the software baseline needed to be changed. Finally, the version of the software package contained in the baseline is modified to the new baseline version, and click OK to complete the baseline change.

What is claimed is:

1. A server for drug research and development software repository, comprising: a user authentication module, a software package upload and index creation module, a baseline release management module, an authorization management module, a software package retrieval and download module, a plurality of adapter plug-ins, and a storage layer; wherein the user authentication module is configured to use a command line tool or a web page on a front end to access software repository resources after authenticated through a username and a password or an application identification and a secret key;

the software package upload and index creation module is configured to receive data from the front end, wherein the data includes a software package and metadata of the software package uploaded through the command line tool or the web page, wherein the metadata includes package type of the software package, store the metadata as meta information in a relational database for indexing, select a corresponding adapter plug-in according to the package type, and use the selected adapter plug-in to store the software package in a corresponding storage source;

the baseline release management module is configured to create a baseline for a large software to be released, select software package components that constitute the baseline and a version of each software package to complete release of the baseline; and after a period of iteration, when a new stable version is reached, update the baseline, wherein a version number of each of the software package components is changed, and new software package components are added;

the authorization management module is configured to adopt role-based access control for authorization management to authorize retrieval and installation of the software package after an account is authorized;

the software package retrieval and download module is configured to, after the account is authenticated by the authorization management module, retrieve and download the software package within an authorized scope;

the adapter plug-in, which is built-in or provided by a user, is configured to connect, based on the selection of the software package upload and index creation module, the software repository to the corresponding source for storage of the software package, so that the plurality of adapter plug-ins can connect different software repositories to different object storage systems and third-party software repositories for storage and download;

the storage layer is configured to use an object storage system or a third-party software repository as the corresponding storage source to store the software package, and use the relational database to store the metadata.

2. The server for drug research and development software repository according to claim 1, wherein the metadata further includes the following main fields:

a package name, a storage source address, a deployment environment, an operating platform, a package version, a software dependency, and a software description.

3. The server for drug research and development software repository according to claim 1, wherein, the package type of the software package is conda;

said using the selected adapter plug-in to store the software package in a corresponding storage source comprises:

using a conda adapter plug-in to store the conda type software package in an object storage service that conforms to a conda channel specification.

4. The server for drug research and development software repository according to claim 1, wherein the baseline created by the baseline release management module is managed and stored as a software package, and when the baseline is needed to be created or upgraded on the front end, a corresponding software package, whose package type is "baseline", is created with all components being used as dependency declaration of the corresponding software package, and the corresponding software package is stored in an object storage service through an adapter plug-in corresponding to the baseline.

5. The server for drug research and development software repository according to claim 1, wherein authorization of the authorization management module is one of baseline authorization and software package authorization, wherein the baseline authorization authorizes access to all software packages contained in a designated baseline, and the software package authorization authorizes for a software package separately.

6. The server for drug research and development software repository according to claim 1, wherein the software package retrieval and download module is configured to, retrieve and download the software package comprises:

searching for corresponding meta information in the relational database to obtain the package type of the software package, and selecting the corresponding adapter plug-in to download the software package according to the determined package type.

* * * * *